United States Patent
Bukowski et al.

(10) Patent No.: US 7,880,909 B2
(45) Date of Patent: *Feb. 1, 2011

(54) EXTENSIBLE FRAMEWORK FOR PARSING VARYING FORMATS OF PRINT STREAM DATA

(76) Inventors: Mark A. Bukowski, 125 Masterson Station Dr., Lexington, KY (US) 40511; Mark B. Greene, 110 Wallace Ct., Lexington, KY (US) 40517; Joel A Jirak, 221 College St., #2, Winchester, KY (US) 40391; Christopher R. Nash, 2015 New Orleans Dr., Lexington, KY (US) 40505; John J. Roberts, 117 Sterling Rd., Georgetown, KY (US) 40324; Steven B. Rogers, 3206 Pimlico Pkwy., Lexington, KY (US) 40517; Craig A. Rudolph, 1325 Redstone Dr., Lexington, KY (US) 40509; Carl J. Voss, 2184 Sallee Dr., Lexington, KY (US) 40513

( * ) Notice: Subject to any disclaimer, the term of this patent is extended or adjusted under 35 U.S.C. 154(b) by 1058 days.

This patent is subject to a terminal disclaimer.

(21) Appl. No.: 10/441,845

(22) Filed: May 20, 2003

(65) Prior Publication Data
US 2004/0252326 A1    Dec. 16, 2004

(51) Int. Cl.
*G06F 17/00* (2006.01)
*G06F 13/00* (2006.01)
(52) U.S. Cl. .................. 358/1.15; 358/1.1; 358/1.13
(58) Field of Classification Search ............ 705/40, 705/39, 8; 709/230, 310, 219, 223; 358/1.15, 358/1.16, 1.1, 1.9, 1.11, 1.13; 707/500, 1; 345/700; 715/523, 517, 526, 513; 706/61, 706/13; 719/321, 328
See application file for complete search history.

(56) References Cited

U.S. PATENT DOCUMENTS

| | | | |
|---|---|---|---|
| 4,811,416 A | | 3/1989 | Nakamura |
| 5,086,309 A | | 2/1992 | Iida et al. |
| 5,303,336 A | * | 4/1994 | Kageyama et al. ......... 358/1.15 |
| 5,339,421 A | | 8/1994 | Housel, III |
| 5,511,156 A | * | 4/1996 | Nagasaka ................. 358/1.1 |
| 5,548,691 A | | 8/1996 | Sato et al. |
| 5,721,813 A | | 2/1998 | Leinhos |
| 5,784,544 A | | 7/1998 | Stevens |
| 5,815,689 A | * | 9/1998 | Shaw et al. ................. 713/400 |
| 5,838,685 A | | 11/1998 | Hochman |
| 5,862,310 A | | 1/1999 | Crawford et al. |
| 5,878,419 A | | 3/1999 | Carter |
| 5,893,131 A | | 4/1999 | Kornfield |
| 6,044,356 A | * | 3/2000 | Murthy et al. ................. 705/8 |
| 6,078,403 A | | 6/2000 | Palmer |
| 6,128,628 A | | 10/2000 | Waclawski et al. |
| 6,223,168 B1 | * | 4/2001 | McGurl et al. ................. 705/40 |
| 6,337,743 B1 | | 1/2002 | Brown et al. |
| 6,401,132 B1 | | 6/2002 | Bellwood et al. |
| 6,449,635 B1 | | 9/2002 | Tilden, Jr. et al. |
| 6,466,967 B2 | | 10/2002 | Landsman et al. |
| 6,571,292 B1 | * | 5/2003 | Fletcher ..................... 709/231 |

(Continued)

*Primary Examiner*—King Y Poon
*Assistant Examiner*—Allen H Nguyen

(57) ABSTRACT

A method of parsing print stream data including the steps of intercepting a data file from at least a portion of the print stream data, reading at least a portion of the data file and determining if said data file is of a format having subset formats.

5 Claims, 2 Drawing Sheets

U.S. PATENT DOCUMENTS

| | | | |
|---|---|---|---|
| 6,961,720 B1 * | 11/2005 | Nelken | 706/47 |
| 7,007,231 B2 * | 2/2006 | Dang | 715/523 |
| 7,096,212 B2 * | 8/2006 | Tribble et al. | 707/1 |
| 7,259,875 B1 * | 8/2007 | Mazza | 358/1.13 |
| 2001/0054046 A1 * | 12/2001 | Mikhailov et al. | 707/500 |
| 2002/0016921 A1 | 2/2002 | Olsen et al. | |
| 2002/0078216 A1 | 6/2002 | Pankovcin et al. | |
| 2002/0083210 A1 | 6/2002 | Harrison et al. | |
| 2002/0120536 A1 | 8/2002 | Maung et al. | |
| 2002/0120790 A1 | 8/2002 | Schwalb | |
| 2002/0129129 A1 * | 9/2002 | Bloch et al. | 709/220 |
| 2002/0138852 A1 | 9/2002 | Reynolds et al. | |
| 2002/0141449 A1 | 10/2002 | Johnson | |
| 2002/0154172 A1 | 10/2002 | Linsey et al. | |
| 2002/0156808 A1 | 10/2002 | Duffy et al. | |
| 2002/0156846 A1 | 10/2002 | Rawat et al. | |
| 2003/0023607 A1 * | 1/2003 | Phelan et al. | 707/100 |
| 2003/0058469 A1 * | 3/2003 | Buis et al. | 358/1.15 |
| 2003/0140809 A1 * | 7/2003 | Krautter | 101/484 |
| 2004/0010629 A1 * | 1/2004 | Diesel et al. | 709/250 |
| 2004/0199876 A1 * | 10/2004 | Ethier et al. | 715/523 |
| 2004/0205562 A1 * | 10/2004 | Rozek et al. | 715/513 |
| 2004/0205694 A1 * | 10/2004 | James et al. | 717/104 |

* cited by examiner

EXTENSIBLE FRAMEWORK FOR PARSING VARYING FORMATS OF PRINT STREAM DATA

BACKGROUND OF THE INVENTION

1. Field of the Invention

The present invention relates to a method of parsing varying formats of print stream data, and, more particularly, to an extensible framework for parsing varying formats of print stream data.

2. Description of the Related Art

The internal function of a data stream handler is defined by the data stream handler itself. A data stream handler appears to an application as a module to read and write a specific type of data stream. A consistent stream interface makes the source and destination of the data stream unimportant to the application that uses the data stream handler. A data stream handler processes one type of data and its output appears as a data stream to an application. A data stream handler can provide data that it manufactures or it can receive data from a file for an external source in a format that an application can use.

In computer systems, information may be passed from one computer process to another computer process using a named pipe. A named pipe or message holding place is given a specific name. Unlike a regular pipe, a named pipe can be used by processes that do not have to share a common process origin and the message sent to the named pipe can be read by any authorized process that knows the name of the named pipe. A named pipe is sometimes called a FIFO (first in, first out), because the first data written to the pipe is the first data that is read from the pipe. An advantage to using a named pipe is that the name associated with it allows other processes to easily locate the information. Loading a named pipe is useful in the processing of data streams.

Converting data into an extensible mark up language (XML) improves the functionality and adaptability of information contained therein. XML is actually a metalanguage for describing other languages, which lets you design your own customized markup language for limitless different types of documents. In contrast, fixed formats such as HTML is a single predefined markup language. XML is a markup specification language, which can be used to design ways of describing information consisting of text or data. The description is normally for storage transmission or processing by way of another program. The XML format says nothing about what should be done with the data, although the choice of element names may hint at what they are to be used for. For example, an XML document describing the characteristics of a machine part does not carry any information about how the information should be presented to a user. However, an element name of "Material Type" may infer that the content relates to the type of material of which the machine part is made. An application is free to use the data to produce an image of the part, generate a formatted text listing of the information, display the XML documents marked up with a particular color scheme, restructure the data into a format for storage into a data base, transmission over the network or input to another program, etc. XML documents can be generally regarded as purely descriptive data files.

What is needed in the art is a method to transfer a varying data print stream into XML documents.

SUMMARY OF THE INVENTION

The present invention provides a method that is used in an extensible framework for parsing varying formats of print stream data.

The invention comprises, in one form thereof, a method of parsing print stream data including the steps of intercepting a data file from at least a portion of the print stream data, reading at least a portion of the data file and determining if the data file is of a format having subset formats.

The invention comprises, in another form thereof, a method of handling data including the steps of providing a data handler, receiving an inquiry by the data handler, the data handler responding to the inquiry by a responding method. The responding method including the substeps of, if the inquiry is to request a data type assigned to the data handler, then returning the data type; if the inquiry is a command to the data handler to parse a data file, then parsing the data file; and if the inquiry is to determine a format of the data file, then returning at least one answer.

The invention comprises, in yet another form thereof, a method of extracting a file, including the steps of intercepting a print job from a data stream, spooling the print job to a data file, inquiring of at least one of a plurality of data handlers as to whether the data file is of a format recognized by at least one data handler and receiving at least one answer that indicates that at least one data handler recognizes a broad format that includes the format as a subset format.

The present invention advantageously accepts varying data formats in a print stream and converts the data stream into at least one XML document.

Another advantage is that the data stream handler of the present invention can indicate the type of data to which it is assigned.

Yet, still another advantage of the present invention is that the data stream handler can identify the possibility of handling a data stream format by responding with a "maybe" answer.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
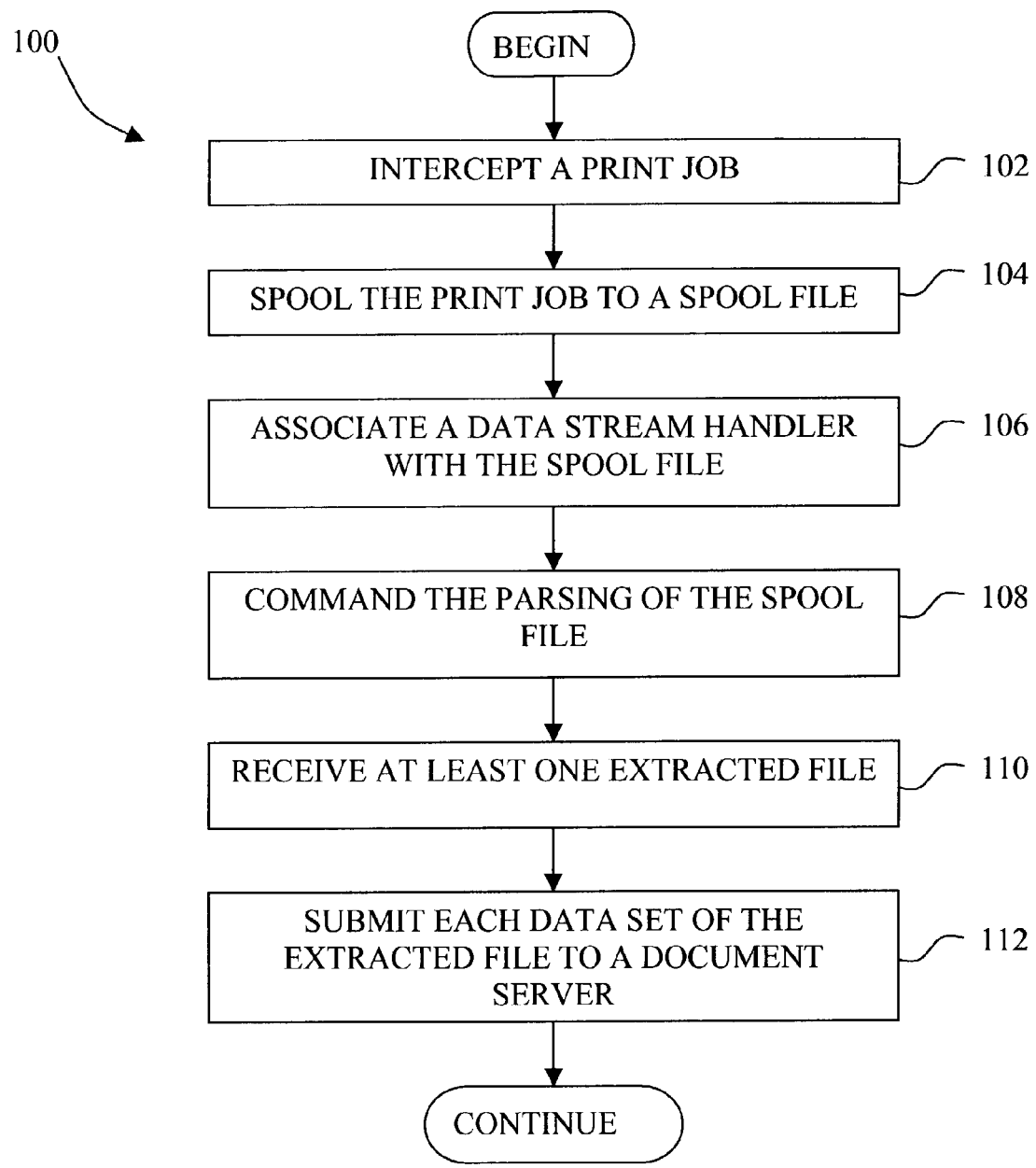
FIG. 1 is block diagram of an embodiment of a method of parsing varying formats of print stream data.

Referring now to the drawings, and more particularly to FIG. 1, there is shown one embodiment of a method 100 of the present invention, including steps to be executed by a computer processor. At step 102, method 100 intercepts print jobs by redirecting them to one or more named pipes.

Within a Document Distributor, "a receiver" is a code module that can format data into a workflow job and submit it to the Document Server Gateway, that is then forwarded to the Document Server. When a Document Server Gateway, which is a Windows® service, is started, any dynamic link library (DLLs) with an extension of .ddr is loaded as a receiver. One such receiver is the named pipe receiver. When the named pipe receiver is loaded by the Document Server Gateway, it in turn loads any server DLLs with an extension of .ddh. Each of these is a data stream handler.

At step 102, a named pipe receiver accepts each print job. Then at step 104, the print job is spooled to a file and a request is queued to a print stream factory.

The print stream factory makes use of several data stream handlers to determine the format of the spooled file and to parse the spooled file into one or more individual workflow jobs.

Figure 2:
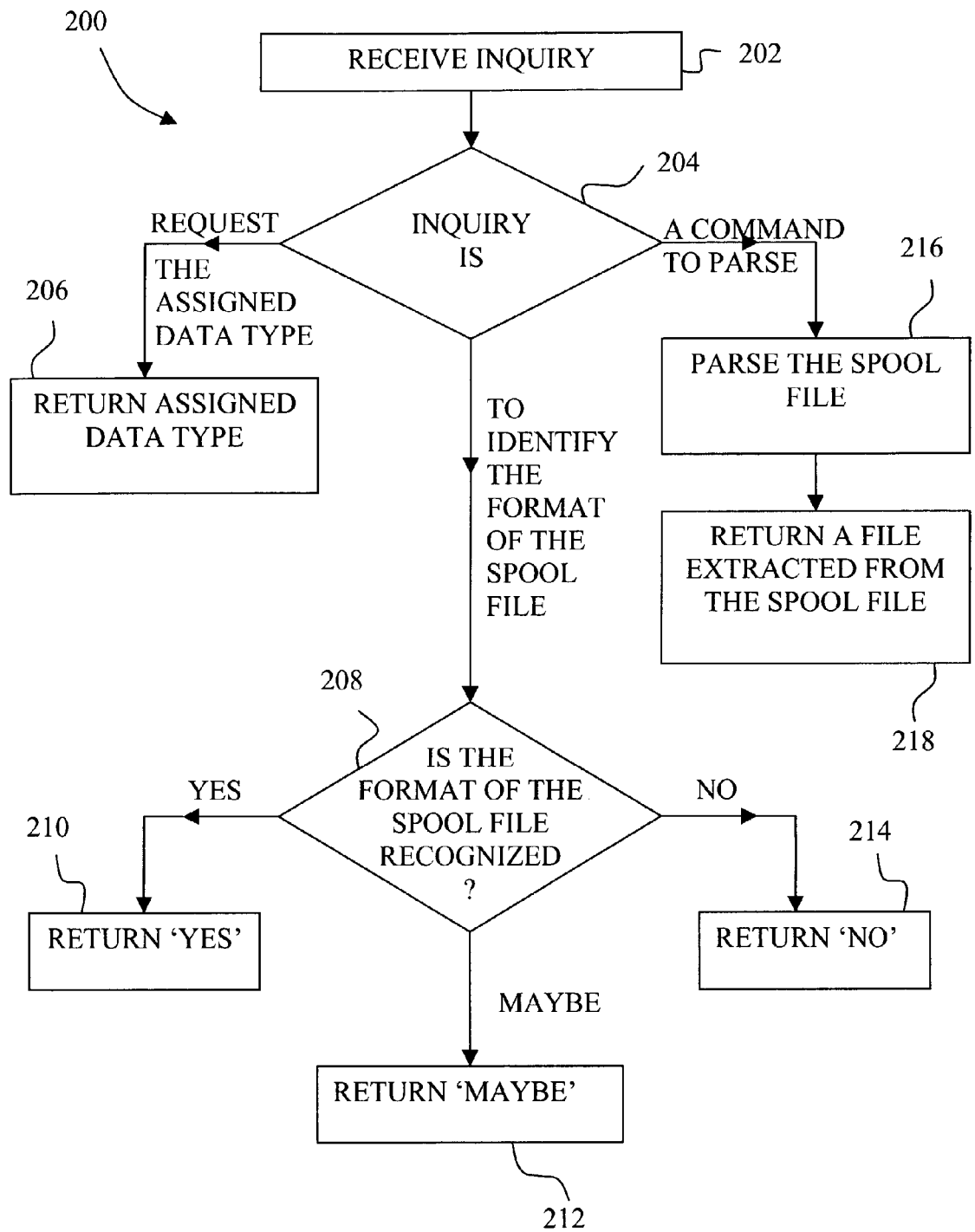
FIG. 2 is a block diagram of an embodiment of the method of the present invention implementing a data stream handler that is called by the method of FIG. 1.

Now, additionally referring to FIG. 2, there is shown a method 200 of an implementation of a data stream handler. Process 200 includes step 202 where an inquiry is received from method 100 at step 106 in which process 100 inquires of process 200 one of two questions or a command. One question is a request for data stream handler 200 to return the assigned data type of the data stream handler to the requesting program. This inquiry is determined at step 204 and is directed to step 206 wherein the assigned data type is returned.

Data stream handler 200 may also receive a command to parse a file, which is determined at step 204, thereby directing control of process 200 to step 216. At step 216, the spooled file that is identified to data stream handler 200 is parsed. At step 218, the parsed file is returned as an extracted file to the requesting program, which in this instance is process 100 wherein the command to parse the spooled file was issued at step 108 and the extracted file was received back by the requesting process, at step 110, in the form of an extracted file.

The second question, which process 100 can inquire of data stream handler 200 is to identify the format of the spooled file. At step 208, data stream handler 200 examines the spooled file to determine the format thereof. The spooled file may be sampled to determine if the file is of a type that the data stream handler recognizes. If the format is recognized by data stream handler 200, process control proceeds to step 210 where data stream handler 200 returns the answer 'yes', indicating that the format of the spooled file is definitely recognized. For example, an XML data stream handler having read an XML file would respond with a "yes" answer. If, at step 208, the format of the spooled file is not recognized then the data stream handler process 200 proceeds to step 214. At step 214, data stream handler process 200 returns an answer of "no", indicating that data stream handler 200 has not recognized the spooled file. This indicates to the calling program that it would be inappropriate to request that this particular data stream handler parse the spooled file.

Additional flexibility of data stream handler 200 is achieved by data stream handler 200 responding with an answer of "maybe". A data stream handler may broadly recognize a file format and yet not be the optimum choice for the purposes of parsing a file. Such a case particularly occurs when a format is a subset of another format. If a data stream handler recognizes a broad format having subset formats, then another data stream handler may be better suited to handle the parsing of the data in the file. As such, the data stream handler provides an answer which indicates that a file format may be recognized. For example, if the data stream handler is an ASCII type of data stream handler and the spooled file is an XML type file an answer of "maybe" is returned, since the XML type file may be of an ASCII type. Then if no other handler responds with a "yes" then the ASCII handler may be selected. However, if an ASCII handler responds with "maybe" and an XML data stream handler responds with "yes" then the XML handler would be selected over the ASCII handler. This advantageously allows a controlling program, such as process 100, to prioritize and select the data stream handler appropriate for parsing the spooled file. In addition, the spooled file may have more than one format contained therein. If a spooled file does contain more than one format then the controlling program may invoke more than one data stream handler 200 in the parsing of a spooled file.

Process 100, at step 106, associates a particular data stream handler with a spooled file by requesting that a data stream handler 200 return the data type for which data stream handler 200 is assigned to parse. At step 106, having determined the format of the spooled file, process 100 assigns a particular data stream handler 200 to parse the spooled file at step 108. Also at step 106, the association of a data stream handler to a particular format may be obtained by asking data stream handler 200 to identify the format of the spooled file, as in step 208 of data stream handler process 200. Process 100 at step 106 prioritizes the data stream handler responses received from multiple data stream handles 200 to determine which data stream handler 200 would be appropriate to parse the spooled file. Then process 100 continues to step 108, where a command is issued to a particular data stream handler 200 to parse the spooled file.

At step 110, process 100 receives at least one extracted file from the selected data stream handler 200. At step 112, data sets, of the extracted file are sent to a Document Server for printing. More particularly, the extracted file is in the form of an XML document, which contains one or more data sets. It is then at step 112 that each of the data sets of the XML file is submitted to the Document Server Gateway as part of a single workflow job.

The structure of the present invention supports the plugging in of support for new types of data. Since each data stream handler contains all of the code required for a particular type of formatted data, a data stream handler that corresponds to a particular data type can simply be added to the framework. In addition, the interface between a data stream handler and the calling program is consistent and straightforward, thereby allowing a calling routine to inquire of any data stream handler in the same manner. The data stream handlers are loaded each time the named pipe receiver is started, making them available to invoking programs.

The present invention advantageously produces an XML document, which is and can be utilized by a calling application to produce a filled in form for printing, such as a preprinted pay roll check. Also the plug-in nature of the present invention allows support for a new data format to be completed without having to make changes to the parsing framework.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of parsing print stream data, comprising:
intercepting a data file from at least a portion of the print stream data;
reading at least a portion of said data file;
determining if said data file is of a format having subset formats, if said data file is of a format having subset formats that said data file is defined as a data file that may be recognized;
determining if the format of said data file is one of recognized and not recognized;
issuing an affirmative answer if said format is recognized;
issuing negative answer if said format is not recognized; and
issuing an answer which indicates that said format may be recognized if said format may be recognized.

2. The method of claim 1, further comprising:
receiving a command to parse said data file;
parsing said data file; and
producing an extracted file.

3. The method of claim 2, further comprising returning said extracted file.

4. The method of claim 2, wherein said extracted file is in an XML format.

5. The method of claim 1, further comprising spooling at least a portion of the print stream data to form said data file.

* * * * *